United States Patent [19]

Hashimoto et al.

[11] Patent Number: 4,639,886
[45] Date of Patent: Jan. 27, 1987

[54] ARITHMETIC SYSTEM HAVING PIPELINE STRUCTURE ARITHMETIC MEANS

[75] Inventors: Masahiro Hashimoto, Sagamihara; Tsuyoshi Watanabe, Hadano; Kenichi Wada, Zama, all of Japan

[73] Assignee: Hitachi, Ltd., Tokyo, Japan

[21] Appl. No.: 509,047

[22] Filed: Jun. 29, 1983

[30] Foreign Application Priority Data

Jun. 29, 1982 [JP] Japan .............. 57-112111

[51] Int. Cl.[4] .............................. G06F 7/38
[52] U.S. Cl. .................. 364/736; 364/749; 364/200
[58] Field of Search ... 364/736, 748, 749, 200 MS File, 364/900 MS File

[56] References Cited

U.S. PATENT DOCUMENTS

| | | |
|---|---|---|
| 3,787,673 | 1/1974 | Watson et al. ............ 364/736 |
| 3,840,861 | 10/1974 | Amdahl et al. ........... 364/200 |
| 3,875,391 | 4/1975 | Shapiro et al. ........... 364/736 |
| 4,025,771 | 5/1977 | Lynch, Jr. et al. ........ 364/736 |
| 4,075,688 | 2/1978 | Lynch, Jr. et al. ........ 364/200 |
| 4,107,773 | 8/1978 | Gilbreath et al. ......... 364/200 |
| 4,110,822 | 8/1978 | Porter et al. ............ 364/200 |
| 4,251,859 | 2/1981 | Momose et al. ........... 364/200 |
| 4,338,675 | 7/1982 | Palmer et al. ............ 364/200 |
| 4,385,365 | 5/1983 | Hashimoto et al. ........ 364/900 |
| 4,398,245 | 8/1983 | Fujita .................... 364/200 |
| 4,399,507 | 8/1983 | Cosgrove et al. .......... 364/200 |
| 4,454,578 | 6/1984 | Matsumoto et al. ........ 364/200 |
| 4,525,796 | 6/1985 | Omoda et al. ............. 364/200 |

OTHER PUBLICATIONS

Watson et al. "Operational Experiences with the TI Advanced Scientific Computer" 1974 National Computer Conference, pp. 389–397.
Stephenson "Control of a Variable Configuration Pipelined Arithmetic Unit" Proc. 11th Allerton Conf. Oct. 1973, pp. 558–567.
Kogge "The Microprogramming of Pipelined Processors".
Davidson et al., "Effective Control for Pipelined Computers" Proc. Compcon Spring 1975, Feb. 1975, pp. 181–183.

Primary Examiner—James D. Thomas
Assistant Examiner—Dale M. Shaw
Attorney, Agent, or Firm—Antonelli, Terry & Wands

[57] ABSTRACT

An arithmetic system includes an arithmetic unit of a pipeline structure for executing arithmetic operations for instructions which require different arithmetic cycles. The arithmetic unit executes N arithmetics in pipeline for N instruction at maximum. Initiation of arithmetic operation for a new instruction in the arithmetic unit is indicated by an indicator which detects that each of the instruction executed in the arithmetic is N cycles before completion of the execution and allows arithmetic operation for the new instruction to be initiated in the succeeding cycle.

20 Claims, 14 Drawing Figures

FIRST INSTRUCTION | FEA | FEB | FEC |

SECOND INSTRUCTION
(LOAD INSTRUCTION)     | FEA |

MACHINE CYCLE    1   2   3

ARITHMETIC SYSTEM HAVING PIPELINE STRUCTURE ARITHMETIC MEANS

BACKGROUND OF THE INVENTION

The present invention generally relates to an arithmetic system incorporating arithmetic means of a pipeline structure. More particularly, the invention concerns an arithmetic system which allows processings to be executed at an increased speed in a data processing system.

As an approach to realization of a high-speed data processing system, there has been known a system where a plurality of arithmetic and logical units (ALU) are used which are optimized for the operations to be performed in the data processing system. A typical example of such data processing system is illustrated in FIG. 1 of the accompanying drawings. In this figure, a reference numeral 1 denotes an instruction unit (also referred to simply as an I unit) for decoding instructions, 2 denotes a storage unit (referred to simply as an S unit) for storing instructions and data, and numeral 3 denotes an arithmetic unit (also referred to as an E unit) for executing arithmetic operations designated or commanded by the instructions. The arithmetic unit or E unit is composed of two sub-units, that is, a floating-point unit (also referred to as an F unit) 4 optimized for executing floating-point instructions at a high speed and a general arithmetic unit (also referred to as a G unit) 5 adapted for executing other arithmetic instructions than the floating-point instructions such as fixed-point instructions, decimal instructions and the like. In practice, the floating-point instructions can also be executed by the G unit 5. However, since the G unit 5 is not designed to perform high speed processing, the F unit 4 destined only for executing the floating-point instruction at a high speed is provided in addition to the G unit 5. When importance is put on economy rather than high-speed operation of the processing system, the F unit 4 can of course be spared.

Next, referring to FIGS. 2 and 3, the manner in which execution of the floating-point instructions is optimized through provision of the F unit 4 mentioned above will be elucidated by taking a floating-point addition/subtraction instruction as an example.

Referring to FIG. 2 which shows an arrangement of the general arithmetic or G unit 5, reference numerals 6, 7, 8 and 9 denote, respectively, work registers incorporated in the G unit 5 for holding data in the course of an arithmetic operation, and a numeral 11 denotes a byte adder adapted for performing addition and subtraction on a byte basis. A reference numeral 12 denotes a parallel adder designed for performing additions and/or subtractions for data which contains a plurality of bytes, e.g. 8 bytes. A numeral 13 denotes a shifter, and a numeral 10 denotes an input data selector circuit for selectively introducing data held by the work registers 6, 7, 8 and 9 to the arithmetic units 11, 12 and/or 13. An output data selector circuit 14 serves to select the results of arithmetic operations performed by the units 11, 12 and 13 for re-storing them in the work registers 6, 7, 8 and 9. It is assumed that one cycle is required for performing arithmetic operations on the data held by the work registers and for returning the results of the arithmetic operations to the work registers in this general arithmetic or G unit.

Now, consideration will be given to a floating-point addition or subtraction instruction. Execution of the instruction for a floating-point addition or subtraction includes the four operations mentioned below:

(i) Two operands are compared with each other with respect to exponents thereof.

(ii) Mantissa of the smaller operand as resulted determined from the comparison of exponents is shifted to the right for digit alignment with the larger operand (this shift is referred to as the pre-shift).

(iii) Addition or subtraction is effected for the mantissas aligned in digit.

(iv) The number of leading "0s (zeros)" of the resultant mantissa is checked to shift the mantissa to the left so that no invalid "0" is present at the leading portion of the mantissa, while the resultant exponent section is corrected in correspondence to the shifting as performed (this is referred to as the post-normalization).

When the operations mentioned above are performed by the G unit of the arrangement shown in FIG. 2, the general arithmetic or G unit is used four times. More specifically, when initiation of the operation is instructed through a line 10a with data being held by the work register 6 or 7, exponents of the operands are compared with each other in the first cycle by using the byte adder 11. In the second cycle, the mantissa of the smaller operand as found from the comparison of the exponents is pre-shifted by means of the shifter 13. In the third cycle, addition or subtraction of mantissas is performed by the parallel adder 12. In the fourth cycle which is for the post-normalization, correction of the exponent is carried out by the adder 11 while the shifting of the mantissa is effected by means of the shifter 13.

Next, it is assumed that the instruction for a floating-point addition or subtraction is to be executed by the optimized operation units constituting the F unit 4. FIG. 3 shows a configuration of the optimized floating-point adder/subtracter unit. Referring to FIG. 3, it is assumed that two floating-point operands are placed in the work registers 15 and 16, respectively. In the first cycle, exponents of the two operands are compared with each other through a comparator 17 with respect to magnitude. Then, the mantissa of the smaller operand determined from the comparison is shifted in respect to the digit by a pre-shifter 19 or 20 to effect the required digit alignment. On the other hand, the value of the larger mantissa is set in a register 18. In the second cycle, the mantissas aligned in digit are subjected to addition or subtraction in a parallel adder 23, the result of which is set in a register 24. Simultaneously, the content of the register 18 is transferred to a register 25. Further, a zero-digit detector 26 detects the number of zero digits located at the leading portion or significant positions of the resultant. In the third cycle, the post-normalization is effected. In other words, correction of the exponent is effected by an adder 27 in accordance with the digit number indicated by the zero-digit detector 26, while the digit shifting of the resultant mantissa is performed by a shifter 28.

As will now be understood, execution of the instruction for the floating-point addition or subtraction requires three cycles when it is executed by the floating-point adder/subtracter unit shown in FIG. 3 in contrast to the general arithmetic or G unit shown in FIG. 2 which requires four cycles for executing the same floating-point addition or subtraction instruction.

In this way, it is possible to enhance the processing capability of a processing system by incorporating arithmetic units optimized for the operations to be effected in the processing system. It should here be mentioned that the F unit 4 shown in FIG. 1 includes a high-speed multiplier/divider and others in addition to the floating-point adder/subtracter unit shown in FIG. 3.

Now, operation of the F unit shown in FIG. 1 will be considered in conjunction with the floating-point adder/subtracter unit shown in FIG. 3 by way of example. It will be recalled that the floating-point adder/subtracter unit is capable of executing the instruction for a floating-point addition or subtraction in three machine cycles, which are discriminated from one another by identifying symbols $FE_A$, $FE_B$, $FE_C$, respectively. Then, these machine cycles $FE_A$, $FE_B$ and $FE_C$ can be defined as follows:

Cycle $FE_A$: Digit alignment of the operands of the floating-point addition/subtraction is carried out by using the byte adder or comparator 17 and the pre-shifters 19 and 20.

Cycle $FE_B$: Addition/subtraction of mantissas is performed by using the parallel adder 23.

Cycle $FE_C$: Post-normalization is performed by using the byte adder 27 and the shifter 28.

It is apparent that each of the arithmetic operation units shown in FIG. 3 is used only once in the three machine cycles for executing the instruction for floating-point addition/subtraction.

In view of this feature, it is possible to enhance the capability of processing a series of floating-point addition/subtraction instructions generated in succession by operating simultaneously the individual arithmetics of the F unit in parallel through a well known pipeline processing. This will be described below by referring to FIGS. 4 and 5 of the accompanying drawings.

FIG. 4 illustrates the manner in which a series of successive floating-point addition/subtraction instructions are executed by the F units without resorting to the pipeline processing. In this case, execution of the second instruction is permitted only after the first instruction has been completely executed. Thus, six machine cycles are taken for executing two successive floating-point addition/subtraction instructions.

FIG. 5 illustrates a manner in which successive floating-point addition/subtraction instructions are executed through a pipeline processing. In this case, execution for the second instruction is activated after one machine cycle in succession to the initiation of execution for the first instruction. After elapse of another machine cycle, a third instruction is activated. In this way, three successive floating-point addition/subtraction instructions can be executed in five machine cycles. This is because the processing of three instructions each of which requires three machine cycle can be simultaneously carried out in one machine cycle by virtue of the pipeline processing.

It will now be apparent that when the arithmetic operation units which are optimized for operations to be executed by an information or data processing system are incorporated in that system, the number of the cycles required for executing the operations can be decreased to provide one advantage, while the performance or processing capability of the system can be enhanced through the pipeline processing by using the same arithmetic units to provide another advantage.

The pipeline processing of the above mentioned type is adopted in the arithmetic unit designed for executing vector instructions in a special purpose computer system. Examples of the arithmetic unit of the pipeline structure for executing the vector instructions are disclosed in Charles M. Stephanson's article titled "CONTROL OF A VARIABLE CONFIGURATION PIPELINED ARITHMETIC UNIT" of "Proceedings ELEVENTH ANNUAL ALLERT ON CONFERENCE ON CIRCUIT AND SYSTEM THEORY" (Oct. 3–5, 1973), pp. 558–567 and W. J. Watoson and H. M. Carr's article titled "Operational experiences with the TI Advanced Sientific Computer" of "AFIPS CONFERENCE PROCEEDINGS" Vol. 43 (May 6–10, 1974), pp. 389–397. Since the vector instruction is so prepared as to process a number of vector elements by a single instruction, the arithmetic processing of the vector elements are performed through a pipeline processing for executing the single vector instruction.

In this connection, it is noted that in the general purpose data processing system hitherto known, the optimized arithmetic units are frequently made use of for the purpose of reducing the number of cycles for executing operations. However, the pipeline processing by using the same arithmetic unit is not actually practiced for the reason the protocol for processing instructions as imposed on the information processing system can no longer be abided by when the pipeline processing is to be effected. A concrete example of such protocol is one in which instructions stored in a storage must be read out in the order in which they are stored and executed in that order. The order or sequence of the instructions stored in the storage is managed with the aid of storage addresses. Usually, when an instruction is read out, a succeeding one is immediately written in. In order to change or alter the order of the instructions by a program, a branch instruction may be provided in a string of the instructions for designating the next instruction as the operand of the branch instruction.

The difficulty of abiding by the protocol prescribing the sequential control as imposed on the instruction processing in the execution through the pipeline processing by the arithmetic unit is ascribable to the fact that the cycles for execution of instructions prepared in the processing system are different from one to another instruction. More specifically, the processing performance or throughput can certainly be enhanced provided that the pipelined arithmetic operation can be carried out when the floating-point addition/subtraction instructions occur in succession, as will be seen in FIG. 5. However, all the instructions processed by the F unit are not necessarily completed in three machine cycles. For example, execution of a load instruction for placing data from the storage in a floating-point register provided in the F unit is completed in one cycle. On the other hand, an instruction for floating-point multiplication/division requires more execution cycles than the addition/subtraction instruction.

It is thus apparent that the difference in the number of cycles for executing instructions by the F unit in dependence on the types of the instructions provides contradiction to the basic rule or principle of the sequential processing of the instructions, when the pipelined arithmetic operations are effected.

FIG. 6 is a view for illustrating contraventions to the rules of sequential processing of instructions in the execution through pipeline processing. Referring to FIG. 6, consideration will be made on the assumption that execution of a first instruction for the floating-point addition/subtraction is followed by a second instruction for loading to a floating-point register. Through the arithmetic pipeline, the floating-point register loading instruction is executed in parallel with execution of the $FE_B$ cycle of the first instruction. This execution is completed in one machine cycle. In this connection, when an overflow exception interrupt request occurs at this time as the result of the execution of the floating-point addition/subtraction instruction, the interrupt has to be effected in precedence to the succeeding execution of the floating-point register loading instruction. This complies with the principle of the sequential instruction control. However, in the case of the example of FIG. 6, the overflow exception is detected in the $FE_C$ cycle of the first instruction, i.e. the floating-point addition/division instruction. At that time, however, execution of the second instruction, i.e. the floating-point register loading instruction has been completed, which means contravention or disobedience to the basic rule or principle of the sequential control. The same holds true even when the second instruction is one to be executed by the G unit in a single cycle in the case of the example illustrated in FIG. 6.

SUMMARY OF THE INVENTION

It is therefore an object of the present invention to provide an arithmetic system which allows pipeline control or processing in arithmetic units to be performed without contravention to the principle of sequential control of instructions, to thereby enhance the processing performance or capability of the arithmetic system.

In view of the above and other objects which will become apparent as description proceeds, there is provided according to a general aspect of the invention an arithmetic system which includes arithmetic means for executing simultaneously N arithmetic operations for N instructions through pipeline processing, and means for indicating that N cycles remain to be executed for completion of each instruction executed by the arithmetic means, wherein the arithmetic means is allowed to initiate the arithmetic operation for a new instruction in accordance with the indication of the indicating means.

In a preferred embodiment of the invention, the arithmetic means includes execution delaying means for causing an arithmetic operation inherently executable in less than N cycles to be executed in N cycles. In this way, the instructions which require different numbers of cycles for execution can be carried out without contravention to the principle or rule of the sequential control of instructions.

In another preferred embodiment of the invention, the arithmetic system includes first arithmetic means for simultaneously executing N arithmetic operations for N instructions through pipeline processing, second arithmetic means for executing only one arithmetic operation at a time, first indicating means for indicating that N cycles remain to be executed for completion of each instruction being executed in the first arithmetic means, second indicating means for indicating the final or last cycle of the arithmetic operation for the instruction being executed in the second arithmetic means, and means for allowing either one of the first or second arithmetic means to initiate arithmetic operation for a new instruction in accordance with the indications issued by the first and the second indicating means. With such arrangement, execution of the instructions can be effected without disobedience to the principle of the sequential control of instructions even though the arithmetic system includes arithmetic means of a pipeline structure in combination with arithmetic means which are not implemented in the pipeline structure.

BRIEF DESCRIPTION OF THE DRAWINGS

The present invention will be apparent from the following detailed description taken in conjunction with the accompanying drawings, in which.

DETAILED DESCRIPTION OF THE PREFERRED EMBODIMENTS

Figure 7:
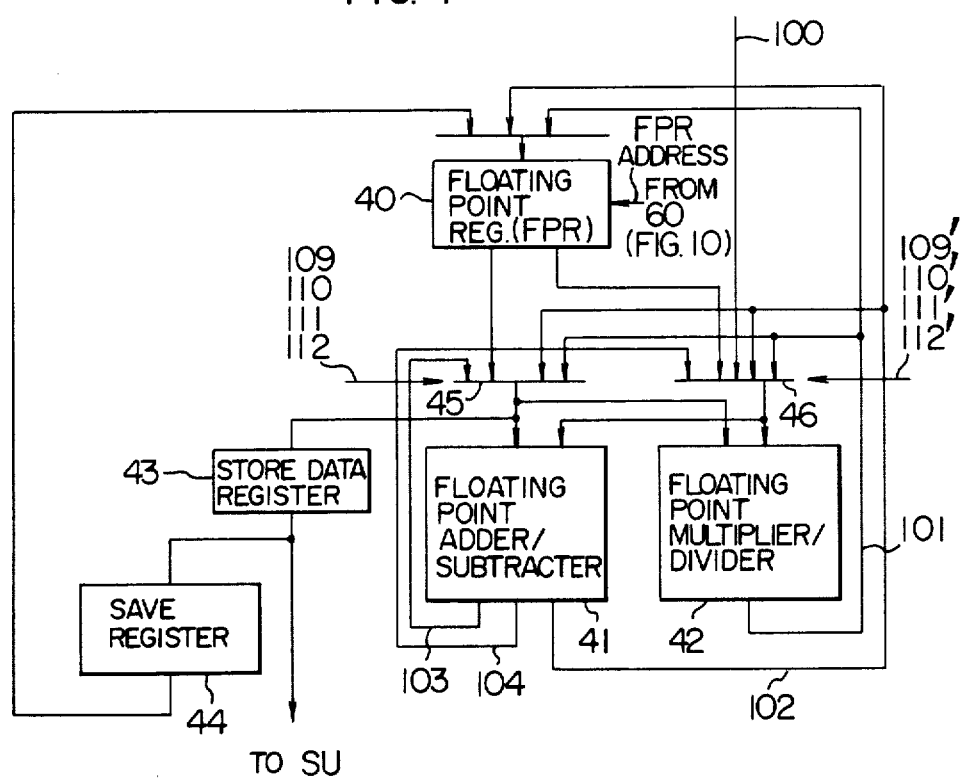
FIG. 7 shows in a schematic block diagram a F unit (i.e. floating-point arithmetic unit) realized in a pipeline structure according to an exemplary embodiment of the present invention.

FIG. 7 shows an exemplary arrangement of an F unit (floating-point arithmetic unit) realized in a pipeline structure according to an embodiment of the present invention. Referring to the figure, reference numeral 40 denotes an addressable floating-point register (hereinafter also referred to simply as FPR) in which floating-point operands are placed, numeral 41 designates a floating-point adder/subtractor unit, numeral 42 designates a floating-point multiplier/divider unit, and a numeral 43 denotes a store data register which serves not only for storing data in case the content of the FPR 40 is to be stored in a storage but also for storing updated data of the FPR 40 before execution thereof in preparation for machine check retry. The data or content of the store data register 43 is transferred to the storage in response to a store instruction. A numeral 44 denotes a save register in which the content of the FPR 40 is saved by way of the store data register 43 upon occurrence of an instruction for arithmetic operation before execution thereof. A signal line 100 serves as an interface for supplying operand data from the storage, instruction for loading data of the storage or operands from the storage in the FPR 40 immediately before execution of an instruction for an arithmetic operation to be performed on the data of the storage and the FPR 40. Data on the signal line 100 is supplied to the floating-point adder/subtractor unit 41 of the floating-point multiplier/divider unit 42 by way of a multiplexer 46. The output of the FPR 40 is also supplied to these two arithmetic units 41 and 42 through multiplexers 45 and 46, respectively, upon initiation of an instruction. The result of the arithmetic operation performed by the floating-point adder/subtracter unit 41 is sent out on a signal line 102, while the result of the arithmetic operation performed by the floating-point multiplier/divider unit 42 is sent out on a signal line 101. The results of the arithmetic operations on the signal lines 101 and 102 are transmitted to the FPR 40 to be stored therein. This storage of the resultant data is performed in a cycle which follows the completion of the execution cycle.

Figure 4:
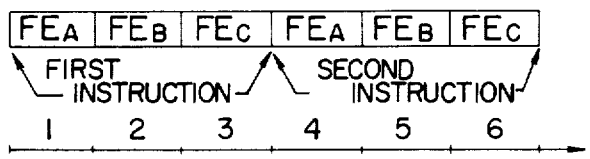
FIG. 4 is a timing chart for illustrating operation of the floating-point arithmetic unit or F unit in which pipeline structure is not adopted.
Figure 5:
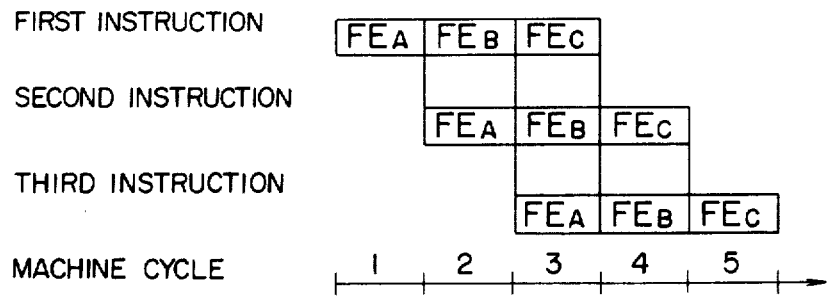
FIG. 5 is a timing chart for illustrating opreation of the F unit which is realized in a pipeline structure.
Figure 6:
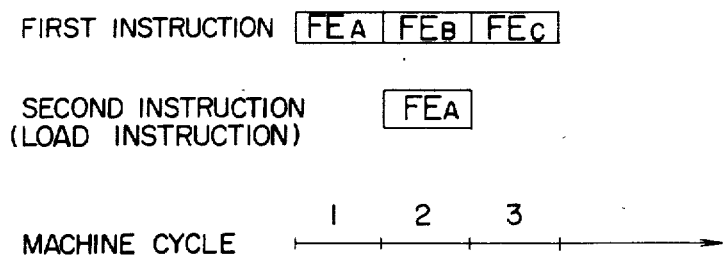
FIG. 6 is a view for illustrating an example of contravention to the principle of sequential control of instructions which occurs upon execution of the instructions through pipeline processing.

As will be seen in FIG. 5, the floating-point adder/-subtracter unit 41 sends out the result of the performed arithmetic operation on the signal line 102 after three cycles $FE_A$, $FE_B$ and $FE_C$. On the other hand, the write-in operation of the corresponding data to the FPR 40 is effected in a succeeding cycle in parallel with the cycle $FE_A$ for the second instruction illustrated in FIG. 4.

Consideration will now be given to the case where two floating-point instructions are to be successively executed by the floating-point adder/subtracter or F unit. In this regard, it is assumed that the result of the arithmetic operation executed in response to the first floating-point instruction and stored in the FPR 40 constitutes an input operand for the second instruction. Then, after the result of the arithmetic operation executed for the first instruction is written in the FPR 40, the data for the second instruction is read out from the FPR 40. As a consequence, execution of the second instruction is delayed by one cycle relative to the state illustrated in FIG. 4. To avoid such delay, there is provided a path for inputting the results of the arithmetic operations sent out on the signal lines 101 and 102 to the multiplexers 45 and 46, respectively, in the case of the circuit configuration shown in FIG. 7, so that the result of the arithmetic operation for the first instruction can be fed back to the arithmetic units 41 and 42 without routing through the FPR 40 to thereby allow the second instruction to be initiated immediately after the execution of $FE_C$ cycle of the first instruction. This kind of path is referred to in the art as an operand wrap-around path. In this way, although it is contemplated by the present invention that the arithmetic operations be executed through pipeline processing in the F unit (floating-point arithmetic unit), as is illustrated in FIG. 5, the F unit is caused to operate in the manner similar to the hitherto known operation illustrated to FIG. 4, when the result of the arithmetic operation for the immediately preceding instruction is utilized an operand for the succeeding instruction.

According to the teaching of the present invention, the length of the execution cycle for the pipeline is determined upon execution of the arithmetic operation through pipelined processing. In the case of the example illustrated in FIG. 7, the length required for execution by the floating-point adder subtracter unit 41 is represented in terms of the number of execution cycles. More specifically, those instructions which are executed in less than three execution cycles in the F unit are initiated at a pitch of one cycle and are terminated at one cycle pitch three cycles.

In the case of instructions which require more than three cycles, inclusive, for execution in the F unit, the pipelined arithmetic operation can be executed in the last two cycles.

Figure 8:
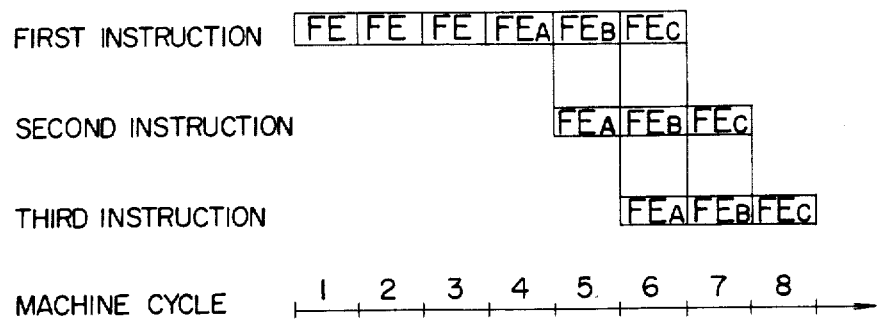
FIG. 8 shows a timing chart for illustrating operation of the F unit shown in FIG. 7.

FIG. 8 is a view for illustrating the pipeline control according to the present invention for an instruction which requires for execution thereof a greater number of the execution cycles than the length of the pipeline cycles in the F unit. Referring to FIG. 8 and assuming that six execution cycles are required for executing a first instruction, no arithmetic pipeline processing is permitted at all for the first three cycles, and the fourth cycle correponds to the $FE_A$ cycle which is provided for indicating that execution of the succeeding instruction may be initiated in the next or succeeding cycle. When the instruction being executed in the F unit has attained the $FE_A$ cycle, there is issued a signal indicating that the succeeding instruction may be executed by the F unit in the next cycle. This signal will hereinafter be referred to as the signal EOFA (an abbreviation of "End of F-unit Class A). When the signal EOFA is produced, the F unit receives the data and control signal required for executing the succeeding instruction from the instruction or I unit (designated by the numeral 1 in FIG. 1) and initiates the succeeding new instruction. In addition, the EOFA signal is supplied to the I unit. Upon reception of the signal EOFA, the I unit gets knowledge of the fact that the F unit has received the information necessary for execution of the succeeding instruction, and thus proceeds with operation to supply a further succeeding instruction to the arithmetic unit.

Although the number of cycles for executing instructions in the F unit differs in dependence on the individual instructions, the number of the execution cycles of the F unit can be considered constant for a given instruction. Accordingly, for the instruction which requires more than four cycles for the execution thereof, the $FE_A$ cycle of the signal EOFA may be caused to make appearance at the last third cycle.

In conjunction with the example illustrated in FIG. 8, it is not preferable to place the $FE_A$ cycle of the first instruction further forward. Otherwise, the end cycles of arithmetic executions for the first instruction and the succeeding instructions would not conform with the order in which the instructions are designated, to thereby infringe on the principle of the sequential control.

Next, assuming that the pipeline length of the F unit corresponds to three cycles, special measures have to be taken for the instruction whose execution is completed in a single cycle. As an example of this kind instruction, there can be mentioned the instruction for storing data of the storage in the FPR (floating-point register) 40. Unless only one cycle is allotted for execution of this type instruction, there may occur such a phenomenon that the results of the arithmetic operations which constitute operands for the succeeding instruction are rewritten when an interrupt is issued in connection with the preceding instruction, thereby contravening the rule or principle of sequential control.

According to an embodiment of the present invention, arrangement is so made that every instruction can be executed by the F unit in three cycles to abide by the rule of the sequential control. However, there are two types of instructions which can be processed in less than three cycles. They are the load-type instructions and the store-type instructions. The load-type instructions load data from either the storage or the FPR to the FPR. Some of these instructions set the sign of the source data to positive, negative or inverted. The store-type instructions store data from the FPR to the storage. These load-type instructions are executed by the floating-point adder/subtracter unit so that the execution can be completed in three cycles. Obedience of the sequential control principle by the store instruction will be described hereinafter.

In the following, an example of execution of the load-type instructions in three cycles with corresponding delays will at first be elucidated by referring to FIGS. 9 and 10. Subsequently, description will be made of the manner in which the cycle $FE_A$ or the signal EOFA is generated in the instruction which requires four or more cycles for execution.

Figure 3:
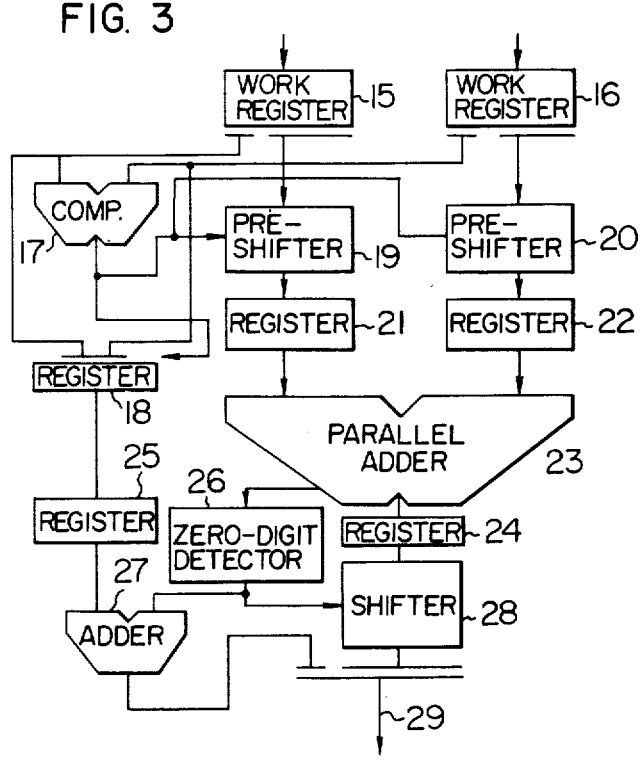
FIG. 3 shows in a block diagram an arrangement of a hitherto known floating-point adder/subtracter.
Figure 9:
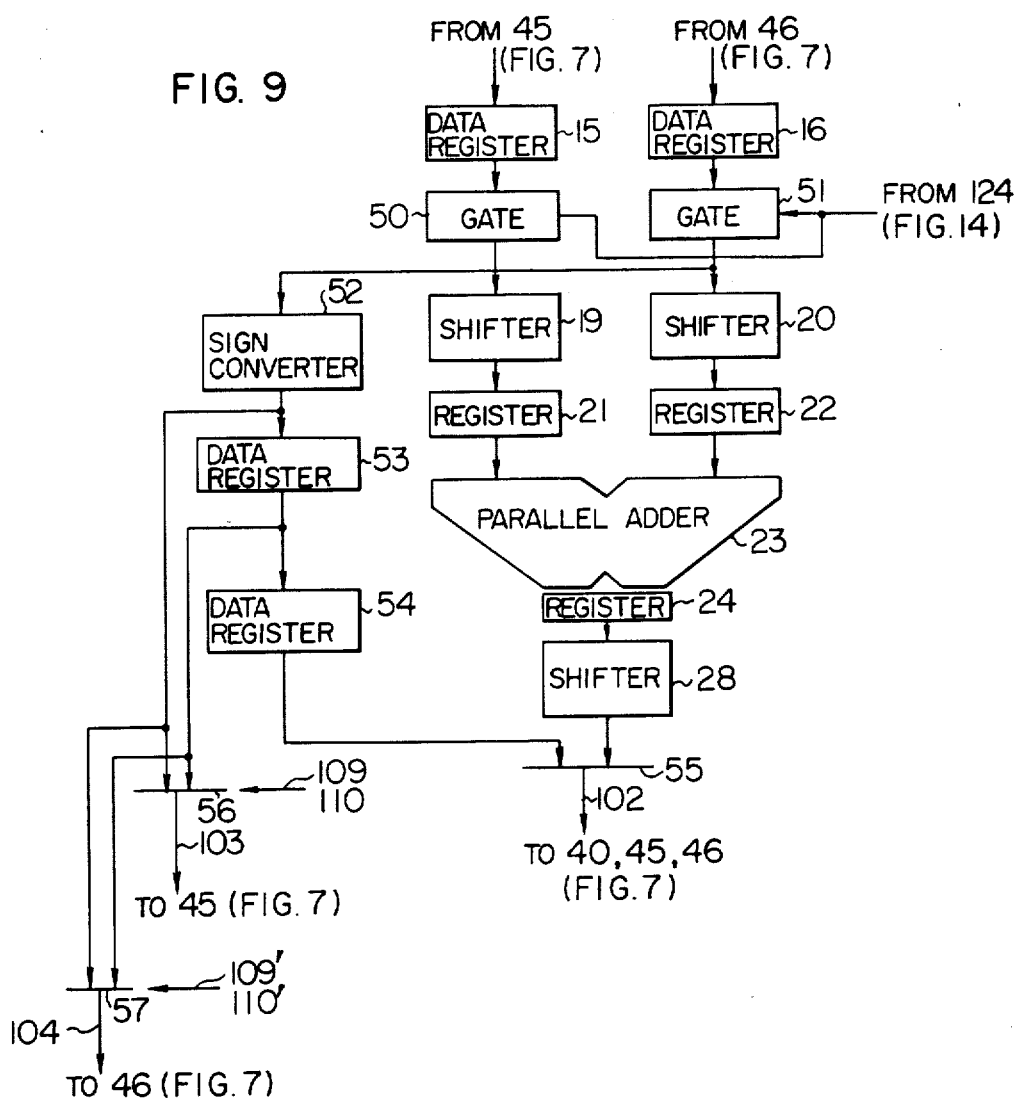
FIG. 9 is a schematic block diagram showing an arrangement of a floating-point addition/subtraction unit realized in a pipeline structure according to an embodiment of the invention.

FIG. 9 shows in detail a circuit configuration of an improved floating-point adder, i.e. a portion of the unit 41 shown in FIG. 7 with the elements 17, 18, 25, 26 and 27 shown in FIG. 3 being omitted for simplification of illustration. Referring to FIG. 9, the output of the multiplexer 45 shown in FIG. 7 is coupled to a data register 15, while the output of the multiplexer 46 shown in FIG. 7 is connected to another data register 16. The data of the registers 15 and 16 are gated through gates 50 and 51 in response to an operation enabling signal appearing on a line 124 to be supplied to shifters 19 and 20, respectively. The operation enabling signal on the line 124 may alternatively be applied to registers 21 and 22. In other words, it is possible to pre-normalize the data of the data registers 15 and 16 by the shifters 18 and 19, respectively, in precedence to application of the operating enabling signal and to set the pre-normalized data in the registers 21 and 22 in response to the operation enabling signal.

Upon execution of a loading instruction, the data to be stored in the FPR makes an appearance in the register 16. Further, in the execution of the load-type instruction, the data is placed in the data register 53 through a sign conversion circuit 52 in the cycle $FE_A$. The sign conversion circuit has a function to convert the signs mentioned hereinbefore in dependence on the types of the instructions. The sign-converted data is transferred to a data register 54 after the sign conversion in the cycle $FE_B$. The data of the data register 54 is outputted on the signal line 102 through a multiplexer 55 in the cycle $FE_C$.

Heretofore, the load-type instructions have been executed in one cycle by applying the output of the sign conversion circuit 52 directly to the multiplexer 55. In contrast, according to the present invention, the registers 53 and 54 are additionally provided to delay the sending of the results of operation by two cycles with a view to abiding by the sequential control principle to thereby facilitate the arithmetic pipelined operation. In this sense, it can be said that the registers 53 and 54 constitute an arithmetic circuit of two stages, although these registers serve merely for passing the data therethrough.

By virtue of the arrangement mentioned above, it is now possible to realize the arithmetic pipeline while abiding by the principle of the sequential control. However, there arises a danger that system performance or capability may possibly be degraded when the results of arithmetic operation for the load type instruction are to be used as input operand data for the succeeding instruction. This may be explained by the fact that since the sending-out of the results of arithmetic operation on the signal line 102 is delayed by two cycles as compared with the hitherto known system, execution of the succeeding instruction can not be initiated after one cycle when the operand lap-around path directly coupled to the multiplexers 45 and 46 from the signal line 102 as described hereinbefore in conjunction with FIG. 7 is used. To avoid the inconvenience mentioned above, there is provided additionally wrap-around paths 103 and 104.

As is shown in FIG. 9, the signal line 103 is connected to the output of the multiplexer 56 having inputs connected to the outputs of the sign conversion circuit 52 and the data register 53. This signal line 103 leads to the multiplexer 45 shown in FIG. 7. In a similar manner, the outputs of the sign conversion circuit 52 and the register 53 are sent out on the signal line 104 through a multiplexer 57. The signal line 104 in turn is connected to the multiplexer 46 shown in FIG. 7. When an instruction makes an appearance which requires for the execution thereof the result of the arithmetic operation performed for the immediately preceding instruction, the multiplexer 45 or 46 outputs the data of the sign conversion circuit 52. On the other hand, when an instruction makes an appearance which is to be initiated after two cycles of the load type or loading instruction and which requires the result of operation performed for the latter, the data of the data register 53 is outputted on the signal line 103 or 104. In this way, the problem of the system performance or capability being deteriorated due to the delay involved by the execution cycle for the load type instruction can be satisfactorily solved by providing the multiplexers 45 and 46 and the signal lines 103 and 104.

Figure 10:
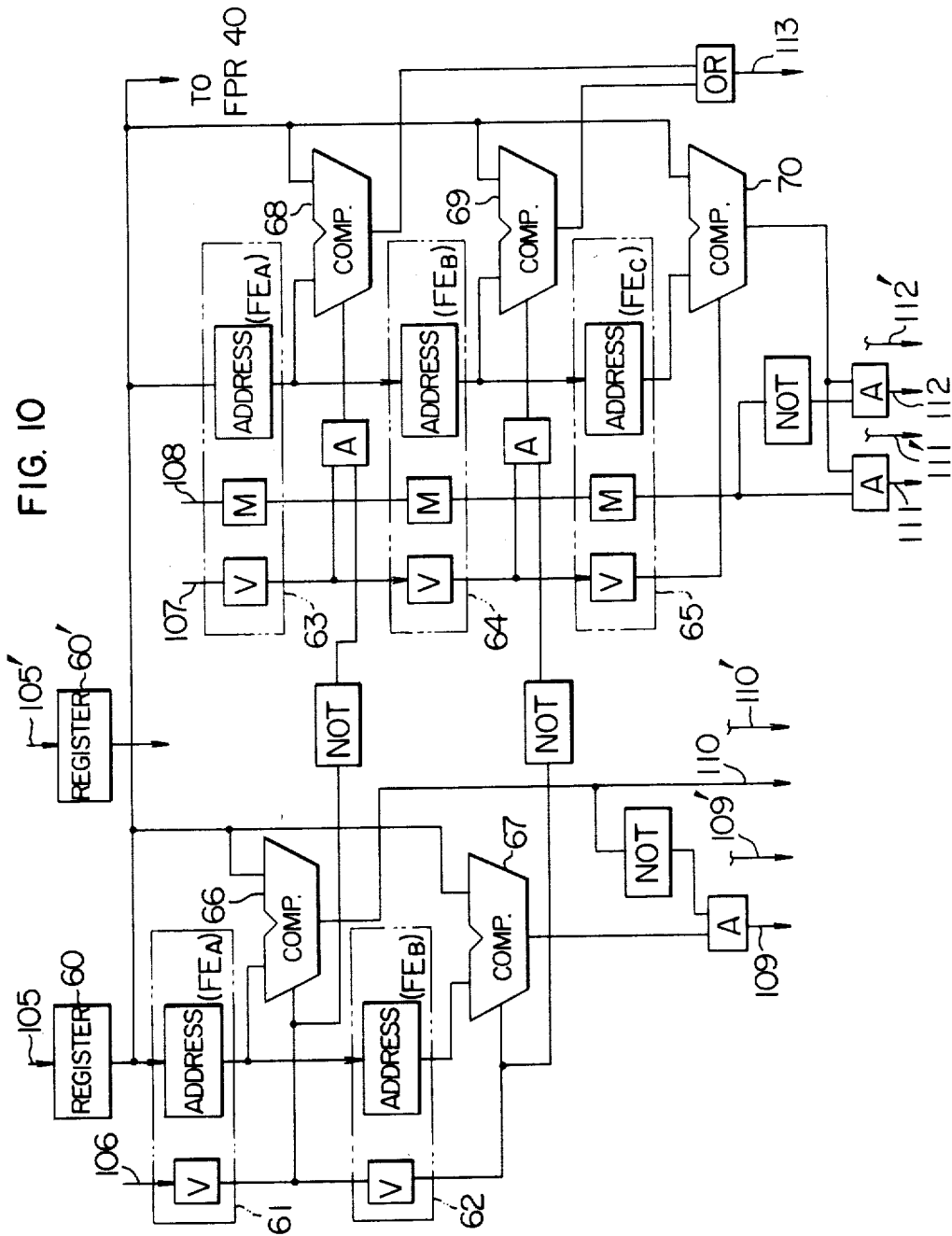
FIG. 10 is a block diagram of succeeding instruction initiating control and wrap-around control logics adopted for the arithmetic pipeline processing according to an embodiment of the invention.

FIG. 10 shows a logic configuration for illustrating the operand wrap-around control in the case where the arithmetic pipeline operation is to be carried out. The circuit shown in FIG. 10 includes control circuitry for the signal lines 103 and 104 additionally provided as described above in conjunction with FIG. 9 and delay control circuitry which serves for such function that when an instruction which requires for execution thereof the result of an arithmetic operation performed for the preceding floating-point addition/subtraction instruction or multiplication/division instruction makes an appearance immediately after or in the two cycles following the latter, execution of the instruction which requires the utilization of the arithmetic result is delayed until execution of the instruction being currently performed has been completed.

Figure 1:
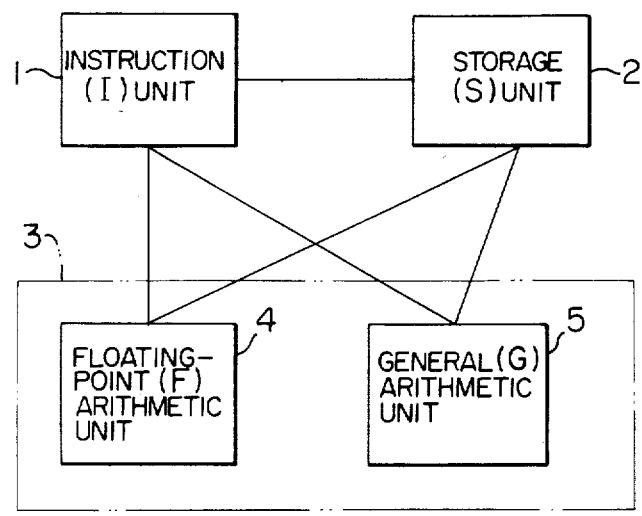
FIG. 1 is a schematic diagram showing a general arrangement of a data processing system.

More specifically, referring to FIG. 10, the signal line 105 constitutes an interface line along which the address of the FPR is transmitted as the operand for an instruction to be executed in the cycle immediately before initiation of the instruction issued by the I (instruction) unit 1 shown in FIG. 1. The address is placed in a register 60 one cycle before initiation of execution of the instruction to be executed. The output of the register 60 is supplied to the FPR 40 (FIG. 7) to be made use of for sending the designated content of the FPR to the multiplexer 45.

On the other hand, registers 61 and 62 serve to store the address of the FPR which serves to store the result of the arithmetic operation for the load-type instruction being executed in the F unit. At the start of the cycle $FE_A$ for the load-type instruction, the content of the register 60 is transferred in the register 61. Further, upon the load-type instruction, a pulse for setting the V-bit to "1" is produced on the signal line 106 immediately preceding the load-type instruction. The V-bit of the register 61 remains "1" during the cycle $FE_A$. When the cycle $FE_A$ of the load-type instruction is started, the register address and the V-bit of the register 61 are transferred to the register 62. Except for the load-type instruction, no pulse is produced on the signal line 106 immediately before the start of the cycle $FE_A$. Accordingly, the V-bit of the register 61 being "1" means that the load-type instruction corresponding to the register address of the register 61 is present in the cycle $FE_A$. Similarly, the V-bit of the register 62 is "1" when the load-type instruction is present in the cycle $FE_B$, while the address of the FPR storing the result of the arithmetic operation is stored in the register 62.

Registers 63, 64 and 65 correspond to the cycles $FE_A$, $FE_B$ and $FE_C$, respectively. When an instruction being currently executed in the F unit is the instruction for storing the result of an arithmetic operation in the FPR 40, the register 63 holds the address of the FPR at which the arithmetic result is to be stored.

When an instruction which enters subsequently the cycle $FE_A$ is the one for updating the FPR 40, a pulse is produced on a signal line 107 to set the V-bit of the register 63 at "1" upon initiation of the cycle $FE_A$. A signal line 108 assumes the state "1" in response to the instruction which is to use the floating-point multiplier/divider unit 42 (FIG. 7), and the M-bit of the register 63 is set to "1" upon starting of the cycle $FE_A$. In this way, the V-bit of the register 63 being "1" indicates that the instruction being executed in the cycle $FE_A$ is the one for commanding the storage of the result of operation in the FPR 40. The storage address of the FPR is held by the register 63. On the other hand, the M-bit of "0" indicates that the floating-point adder/subtracter unit 41 (FIG. 7) is operating, while the M-bit of "1" indicates that the floating-point multiplier/divider 42 (FIG. 7) is currently operating. The content of the register 63 is tranferred to the register 64 upon starting of the cycle $FE_B$, while the content of the register 64 is transferred to the register 65 upon initiation of the cycle $FE_C$.

The content of the register 61 is supplied to an input of a comparator 66, while the content of the register 62 is applied to an input of a compartor 67. The comparators 66 and 67 have the other respective inputs supplied with the content of the register 60. The comparator 66 compares the operation result storing FPR addresses for the load instruction being currently executed in the cycle $FE_A$ and the instruction to be next excuted. Provided that the FPR address held in the register 61 coincides with the FPR address held in the register 60 and that the V-bit of the register 61 is "1", the output signal line 110 of the comparator 66 is set to the state "1". The signal line 110 is connected to the multiplexer 56 (FIG. 9) on the one hand and to the multiplexer 45 (FIG. 7) on the other hand, to thereby provide an indication for causing the multiplexer 56 to select the output of the sign conversion circuit 52 while causing the multiplexer 45 to select the data on the signal line 103.

The comparator 67 compares the contents of the registers 62 and 60 with each other for controlling the wrap-around path when the instruction makes an appearance which requires for execution thereof the result of operation of the load instruction at the second cycle after the initiation of said load instruction. More specifically, when the comparison made by the comparator 67 results in a coincidence while the comparison made by the comparator 66 at that time results in a discrepancy, the signal line 109 takes the state "1" under the action of an inverter circuit NOT and an AND circuit A. Similarly to the signal line 110, the signal line 109 is connected to the multiplexer 56 (FIG. 9) and the multiplexer 45 (FIG. 7) to cause the content of the register 53 to be outputted on the signal line 103. When the output of the comparator 66 indicates coincidence, the signal line 109 is not set to "1" to assure the processing order for two successive load-type instructions, when they make an appearance.

The comparators 66 and 67 are inherently adapted to control the multiplexers 56 and 45, respectively. However, there exist some instructions which require two input data from the FPR 40. For this reason, a logic circuit is required for controlling the multiplexer 57 (FIG. 9) and the multiplexer 46 (FIG. 7). To this end, by taking advantage of the fact that an address for reading out the other FPR 40 is issued by the I unit immediately before initiation of an instruction, a circuit for comparing the said address with the contents of the registers 61 and 62 is provided in the manner similar to the comparators 66 and 67. This arrangement is represented in a simplified form by a line 105', a register 60' and signal lines 109' and 110'.

Next, the operation of comparators 68, 69 and 70 will be described. The comparator 68 serves to compare the content of the register 60 with that of the register 63, while the comparator 69 compares the content of the register 60 with that of the register 64. Provided that the FPR address placed in the register 63 coincides with the content of the registr 60 and that the V-bit of the register 61 is "0" with the V-bit of the register 63 being "1", the comparator 68 produces a signal "1" on a signal line 113. Thus, the function of the comparator 68 is to detect that an instruction being currently executed in the cycle $FE_A$ is other than the load-type instructions and the result of the execution is to be stored in the FPR 40 for utilization as the input data by the instruction next to be executed. Similarly to the comparator 68, the function of the comparator 69 resides in detecting that the result of operation for the instruction other than the load-type instructions which is being executed in the cycle $FE_B$ is requested by the instruction whose execution is to be initiated in the next cycle, to thereby produce logic "1" on the signal line 113. When the state of the signal line 113 is set to "1", initiation of execution for the next instruction is delayed by one cycle, as will be described hereinafter by referring to FIG. 14.

The comparator 70 serves to manage the cycle $FE_C$ and compares the content of the register 65 with that of the register 60. Provided that the address portion of the register 65 coincides with the content of the register 60 and that the V-bit of the register 65 is logic "1", the comparator 70 outputs logic "1". When comparison made by the comparator 70 results in coincidence in this way, the signal line 111 is set to "1" provided that the M-bit of the register 65 is "1", and otherwise the signal line 112 is set to "1". The signal lines 111 and 112 are connected to the multiplexer 45 (FIG. 7). The signal line 111 serves to cause the multiplexer 45 to output the resultant data 101 of the floating-point multiplier/divider unit 42. On the other hand, the signal line 112 operates to cause the multiplexer 45 to select as the output the resultant data 102 of the floating-point adder/subtracter unit 41.

In brief, the registers 63 and 64 and the comparators 68 and 69 cooperate to delay the initiation of execution for a succeeding instruction until the result of operation for the preceding instruction being currently executed is obtained, when the former requires for execution thereof the result of operation for the latter. The register 65 cooperates with the comparator 70 to detect in the last execution cycle that the aforementioned result of operation is required for the execution of the succeeding instruction, to thereby cause the multiplexer 45 to effect a lap-around operation.

As described in conjunction with the registers 61 and 62, there exist some instructions which require two input data from the FPR 40. Accordingly, it is necessary to provide comparators for making comparison with the address of the second FPR placed in the register 60' in a similar manner to the comparators 68, 69 and 70. In this case, the comparator in question is provided with one input to which the V-bits of the registers 63 and 61, the V-bits of the registers 64 and 62 or the output of the register 65 in correspondence with the comparators 68, 69 or 70 and the other input to which the address of the second FPR is applied. The outputs of the comparators corresponding to the comparators 68 and 69 are applied to an OR circuit OR to be outputted on the signal line 113 shown in FIG. 10, to thereby cause the initiation of execution for the succeeding instruction to be correspondingly delayed. On the other hand, the output of the comparator corresponding to the comparator 70 acts by way of the signal lines 111' and 112° on the multiplexer 46 to thereby cause the latter to produce control signals directly on the signal lines 101 and 102.

Figure 11:
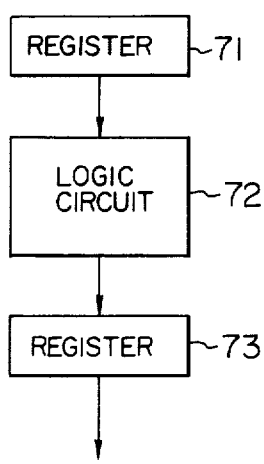
FIG. 11 is a schematic block diagram for illustrating an execution cycle indicating or designating logic mechanism for the F unit in an instruction or I unit according to an embodiment of the invention.
Figure 12:
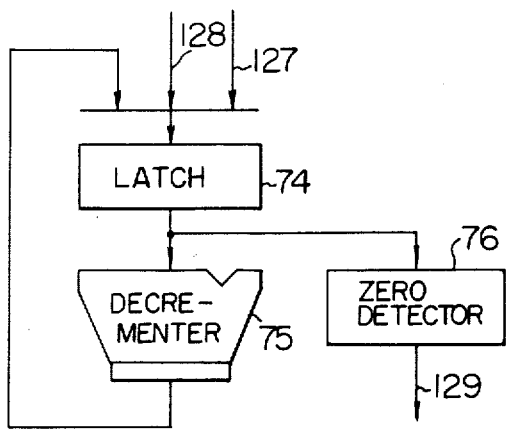
FIG. 12 is a schematic diagram for illustrating an $FE_A$ detecting logic mechanism in the F unit according to an embodiment of the invention.

Next, description will be made on a logic which is adapted for generating the cycle $FE_A$ or the signal EOFA three cycles before the completion of execution of an instruction which takes four or more cycle in the execution by the F unit. FIGS. 11 and 12 show circuit arrangements to this end.

FIG. 11 shows an execution cycle designating logical mechanism for the F unit which mechanism is incorporated in the I unit. Referring to the figure, an instruction code is placed in a register 71. A logic circuit 72 has the input supplied with the instruction code from the register 71 to decode the latter. The output data of the logic circuit 72 is loaded in an output register 73. The logic circuit 72 may be constituted by a memory element which can be addressed with the content of the register 71, i.e. the instruction code. When an instruction to be executed in the F unit is decoded by an instruction decoding unit, the decoded instruction code is placed in the register 71 while the result of operation of the logic circuit 72 is loaded in the output register 73. The function of the logic circuit 72 is to produce output signals representing the number of execution cycles required for instructions to be executed in the F unit in correspondence with the instructions. More specifically, the logic circuit 72 produces a value representative of the difference "the number of execution cycles taken by the F unit minus three" in terms of a binary code. For example, in case an instruction is executed in no more than three cycles $FE_A$, $FE_B$ and $FE_C$ by the F unit, the logic circuit 72 produces "0" (because 3−3=binary 0) for that instruction. On the other hand, for an instruction which requires four cycles for the execution in the F unit, the logic circuit 72 outputs "1" (for 4−3=binary 1).

The output of the register 73 is connected to a register 74 shown in FIG. 12 by way of an interface line 127. FIG. 12 illustrates an $FE_A$ cycle detecting logic mechanism for the F unit. Referring to this figure, the register 74 serves as an execution cycle hold latch for indicating how many cycles an instruction being executed has to pass to reach the cycle $FE_A$. A reference numeral 75 denotes a decrementer for decrementing the content of the register 74 by "1" for each cycle, and 76 denotes a "0" (zero) detecting circuit. An interface line 128 is used for modifying the content or value of the register 74 to forcibly correct the number of execution cycles by an arithmetic unit incorporated in the F unit in case the execution in the F unit is completed before (or after) the predicted number of execution cycles is attained.

When the I unit decodes an instruction to thereby activate the F unit, the number of execution cycles minus 3 is placed in the register 74 through the interface line 127 simultaneously with the activation of the F unit. The content of the register 74 is supplied to the input of the zero detecting circuit 76. When the content of the register 74 is "0", which means that the arithmetic cycle to be entered is the cycle $FE_A$, the zero detecting circuit 76 sets the signal line 129 to the state "1" to inform the individual components of the system that the cycle ready for being initiated is the cycle $FE_A$. In the cycle $FE_A$, that is, when the signal line 129 is in the logic "1" state and the I unit can command the initiation of arithmetic operation to the F unit, the value on the interface line 127 is placed in the register 74. In the cycle other than $FE_A$ or in case the I unit is not in the state to trigger the activation of the F unit even in the cycle $FE_A$, the output of the decrementer 75 is usually placed in the register 74. The decrementer 75 outputs a value equal to the content of the register 74 minus "1" (one) so far as the content of the register 74 is not "0" (zero). When the content of the register 74 is zero, the output of the decrementer 75 is also zero. The register 74 sets the output of the decrementer at each arithmetic cycle. In this way, when the content or value of the register 74 is decremented by "1" for every execution cycle after the F unit initiates execution of an instruction and is reduced to "0" (zero), the signal line 129 is set to logic "1" to indicate the $FE_A$ cycle, as described above.

When a factor or cause for modification of the number of execution cycles is detected in the course of execution of the instruction supplied by the I unit through the interface line 127, the interface line 128 serves to supply the modified or corrected number of execution cycles. Such situation will arise, for example, when the bits of one operand are all "0s" in a floating-point multiplication. Realization of a floating-point multiplication generally requires normalization of the input data, normalization of the output data and several loops of multiplication. Thus, the floating-point multiplication requires a larger number of execution cycles when compared with the floating-point addition or subtraction. In this connection, when either one of the input data constituting the operands is zero, the result of the arithmetic operation is naturally zero, allowing the result of operation to be known without executing the arithmetic loops. In other words, the execution can be completed before a number of execution cycles issued by the I unit through the interface line 127 are utilized. Under such circumstance, the register 74 is loaded with "0" from the signal line 128, whereby the $FE_A$ cycle can be instantly indicated by the signal line 129. This state of the signal line 129 can be made use of as the operation enabling signal on the signal line 124 described hereinbefore in conjunction with FIG. 9.

When the pipelined arithmetic operations are performed in the F unit in the manner described above, the operands are written in the same order as the instructions. Accordingly, when an interrupt is generated in conjunction with an instruction being executed in the F unit, execution of the succeeding instruction is inhibited. In this way, the principle of the sequential control of instructions can be easily abided by with fidelity in the F unit.

Figure 2:
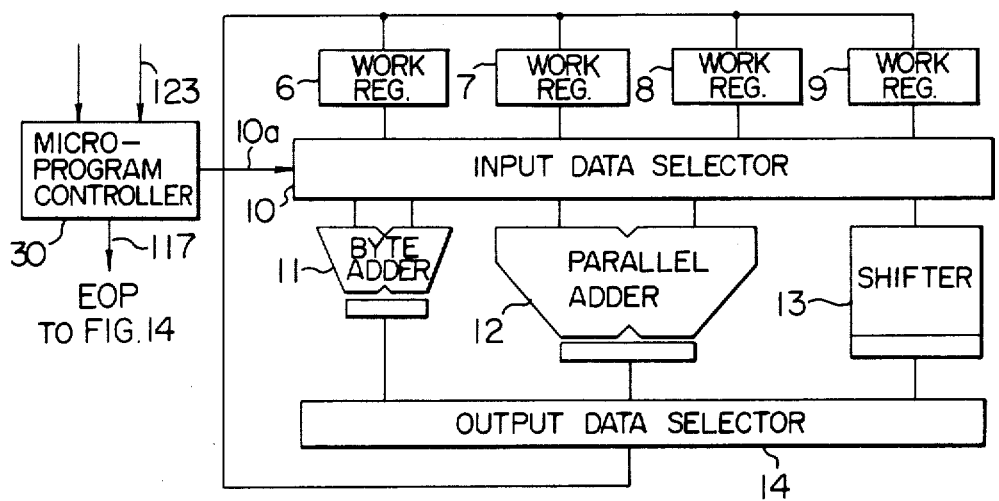
FIG. 2 is a block diagram showing an arrangement of a general or G arithmetic unit employed in the system shown in FIG. 1.

The general arithmetic unit or G unit 5 shown in FIG. 1 is destined to process all the instructions except for the floating-point instructions. The internal configuration of the G unit 5 is so designed that the basic arithmetic operation is completed within one cycle, as is shown in FIG. 2. Most of the instructions processed by the G unit 5 can be completely processed in one or two cycles of execution. In consideration of the fact that the arithmetic operations processed by the F unit can be pipelined, there may arise such a case in contradiction to the rule of sequential control that a succeeding G-unit execution instruction has already been completely processed upon completion of a preceding F-unit execution instruction, when initiation of execution of the instruction is permitted to the G unit immediately after the cycle $FE_A$ of the F unit. To deal with the trouble mentioned above, such arrangement has to be adopted in the F unit that execution of an instruction requires at least three cycles.

In order to assure that both the F unit and the G unit abide by the principle of the sequential control in the processing of instructions, it may be conceived to configure also the G unit to have such an arrangement that execution of each instruction requires three cycles. However, in consideration of the fact that the operand updated as the result of execution in the G unit has relations to numerous elements such as control registers, program status word, general register, storage and others of the processing system and that the general register or the like is used not only for the operands but also as the base register for calculating the address of the operand as well as the index register, a great difficulty is encountered in realizing the G unit in the configuration suggested above because the structures for data bypass means and others will become impracticably complicated when the operand updating cycle is to be delayed without degrading the instruction processing capability.

To deal with the above problem, such an arrangement may be adopted that when an instruction which follows the issue of the EOFA signal is the instruction to be executed in the F unit, execution of that instruction is allowed to be immediately initiated at the succeeding cycle, while in case the instruction in concern is the one to be executed in the G unit, execution of that instruction is allowed to be initiated after completed execution of the F-unit instruction, i.e. after the cycle $FE_C$.

As is well known, the G unit issues such a signal in the last cycle of an instruction execution which indicates that a succeeding instruction may be executed at the next following cycle. This signal is referred to as the signal EOP (an abbreviation of "End Of Operation"). When the G unit issues the signal EOP, this means that all the instructions can be executed starting from the succeeding cycle. As is shown in FIG. 2, the G unit includes a controller 30 which serves to issue the signal EOP.

Here, it should be recalled that, with the intention to allow the arithmetic operations to be executed in pipeline in the F unit, the instruction which can be inherently executed in one cycle is executed in three cycles. Accordingly, when an instruction to be executed in the G unit makes an appearance following this type of instruction, the initiation of execution of the G-unit instruction is delayed for two cycles because of the signal EOFA issued in the cycle $FE_A$. This means that application of the arithmetic pipeline to the F unit involves degradation in the system processing capability or performance. In this connection, it is noted that since the instruction which can be inherently executed in one cycle is caused to be executed in three cycles, an interrupt generated in conjunction with this type of instruction can be detected in the cycle $FE_A$, i.e. in the first cycle of execution. Accordingly, when the succeeding instruction for the G unit is executed immediately after the cycle $FE_A$, execution of the G-unit instruction can be initiated in succession to the cycle $FE_A$ without infringing the principle of the sequential control, provided that the execution of the next following cycle in the G unit is inhibited after detection of the interrupt. To this end, the signal EOP may be issued in place of the signal EOFA in the cycle $FE_A$, when the instruction which is inherently executed in the F unit in one cycle is executed in three cycles to realize the pipelined processing.

Further, there may possibly exist such an instruction which can be inherently executed in two cycles in the F unit but is executed in three cycles to realize the arithmetic pipeline. In this case, a signal which allows execution of the G-unit instruction to be initiated simultaneously with the cycle $FE_C$ may be prepared and issued in the execution cycle $FE_A$ for that instruction. This signal is referred to as the signal EOFB (an abbreviation of "End Of F-unit class B").

In summary, there are three kinds of declarations for completed execution of the instructions, as mentioned below. In general, when an arithmetic pipeline requires N machine cycles, there are N types or kinds of declarations for the completed execution of the instructions.

EOP . . . issued in the last execution cycle of the G-unit instruction or in the execution cycle $FE_A$ for the instruction whose execution is inherently accomplished in one cycle among the instructions to be executed in the F unit.

EOFB . . . issued in the execution cycle $FE_A$ for the instruction whose execution is inherently completed in two cycles among the instructions to be executed in the F unit.

EOFA . . . issued in the execution cycle $FE_A$ for the instruction whose execution requires three or more cycles among the instructions to be executed in the F unit.

Figure 13:
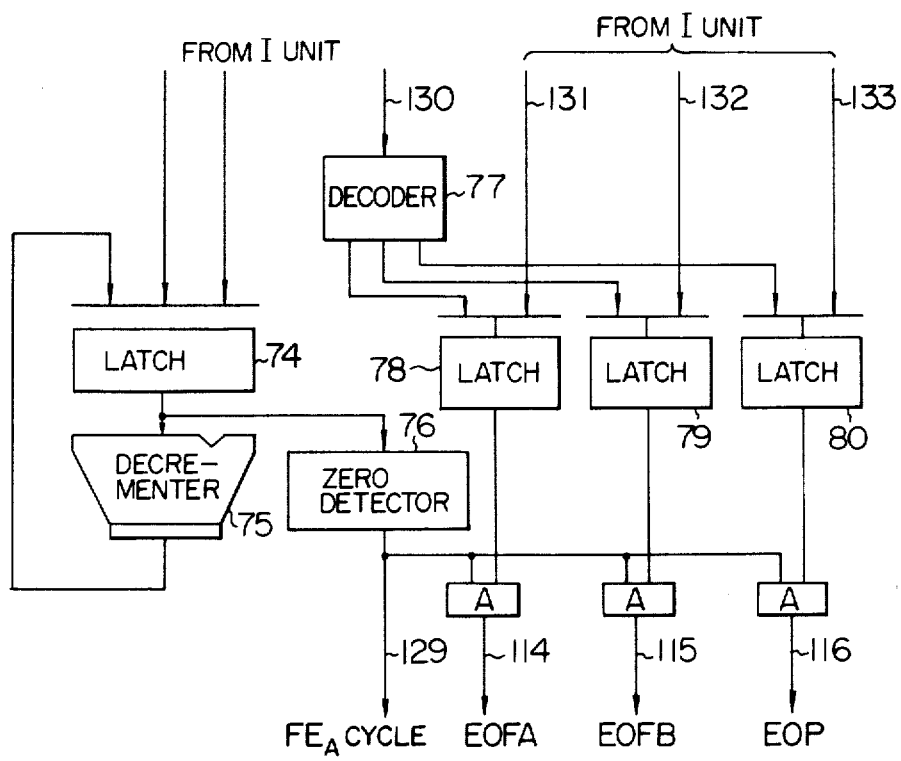
FIG. 13 is a schematic block diagram for illustrating a completion-of-instruction declaration issuing logic mechanism in the F unit according to an embodiment of the invention.

FIG. 13 shows an $FE_A$ detecting logic mechanism which is improved over the one shown in FIG. 12 in such a manner that the F unit can issue the three kinds of the completed instruction declarations. Referred to FIG. 13, operations of the execution cycle number hold latch 74, the decrementer 75, the interface line 127 for transmissions of the execution cycle numbers issued by the zero detecting circuit 76 and the I (instruction) unit and the interface line 128 for transmitting the execution cycle modifying signal issued internally of the F unit are the same as those shown in FIG. 12. It is however to be noted that three latches 78, 79 and 80 are additionally provided. These latches 78, 79 and 80 are adapted to store the completed instruction declaration EOFA, EOFB or EOP to be made by the instruction being currently executed. These declaration signals are adapted to be outputted by the I unit in such a manner that one of the declaration signals EOFA, EOFB and EOP becomes logic "1" in accordance with the instruction code decoded by the I unit in a similar manner to the line 127 for interfacing the execution cycle number signal issued by the I unit. The logical arrangement to this end may be realized in the configuration shown in FIG. 11. The output signals of the I unit are produced when the I unit activates the F unit and supplied to the latches 78, 79 and 80 through interface lines 131, 132 and 133, respectively. When the instruction being currently executed has entered the cycle $FE_A$, the zero detecting circuit 76 produces logic "1" on the $FE_A$ cycle indicating line 129. This signal of "1" is ANDed with the output signals from the latches 77, 79 and 80 through respective AND circuits, whereby one of the signal lines 114, 115 and 116 is set to the logic "1" state in the cycle $FE_A$. Thus, in the cycles $FE_A$, a pulse is sent on the signal line 114 when the declaration EOFA is indicated, while the pulse is sent on the signal line 115 or 116 for the declaration signal EOFB or EOP, respectively. A signal line 130 serves to indicate modification of the content held by the latch 78, 79 and/or 80 when a cause or factor necessitating the modification of the completed execution declaration is detected in the course of execution of an instruction in the F unit, whereby the content of the latch 78, 79 or 80 is correspondingly updated in the timing at which the content of the execution cycle number holding latch 74 is modified through the signal line 128. The signal on the signal line 130 is constituted by two bits which are combined so as to designate either one of the declarations EOP, EOFA or EOFB. These two bits are decoded by the decoder 77 so that one of the outputs thereof takes the logic level "1" with the remaining outputs being "0s". By way of example, when "0" is detected in either one of input data in the floating-point multiplication, this means that there is no possibility of an interrupt such as overflow, underflow and the like being detected subsequently. Accordingly, the contents of the latches 78, 79 and 80 are modified to the combination of "0", "0" and "1" which represents the declaration EOP.

All the instructions executed in the F unit can be initiated at the cycle which follows any one of three completed execution declarations. On the other hand, execution of the G-unit instruction can be initiated at the cycle immediately following the EOP signal, one cycle later for the signal EOFB and two cycles later for the declaration signal EOFA.

An exemplary circuit configuration for performing the controls mentioned above is shown in FIG. 14. Referring to the figure, a signal line 114 carries the signal EOFA issued in the cycle $FE_A$, a signal line 115 carries the signal EOFB, a signal line 116 carries the signal EOP and a signal line 117 carries the signal EOP issued in the last execution cycle of the G unit. Further, a signal line 119 carries data issued by the I unit and is required for initiating the execution of the next instruction and a ready signal which indicates that the control signals are in the state ready for being sent to the G unit and the F unit. The signal or data transmitted by the signal lines 119 and 120 is supplied by the I unit and indicates, respectively, the instruction for commanding the G unit to operate in the succeeding cycle and the instruction for commanding the F unit to operate in the succeeding cycle. Since the one of the F unit and the G unit which is to operate is determined by the instruction, the I unit decodes the instruction code, the result of which is sent out.

Figure 14:
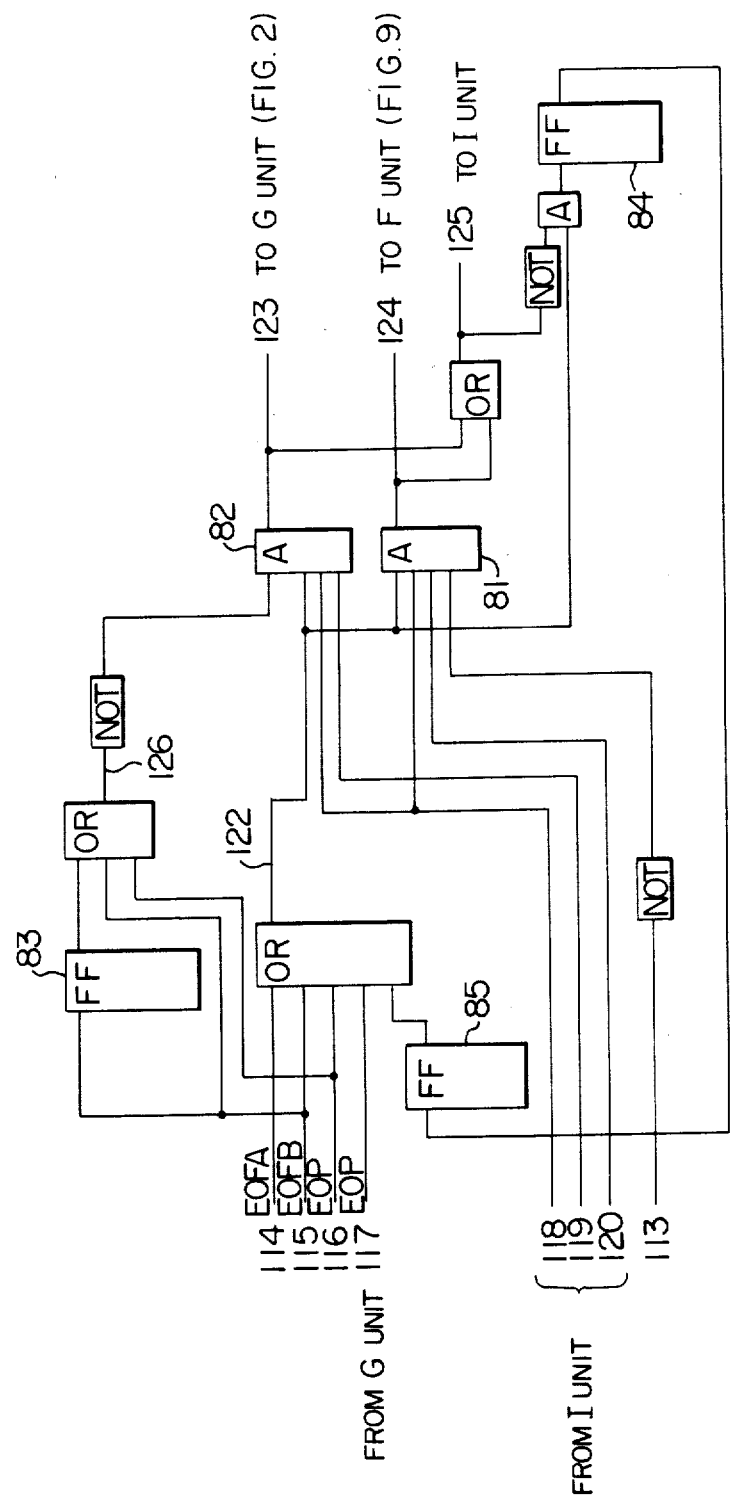
FIG. 14 is a schematic block diagram showing an initiation-of-instruction control logic mechanism for the F unit and G unit (general arithmetic unit) according to an embodiment of the invention.

The circuit shown in FIG. 14 receives the signal mentioned above as well as data required for initiating the succeeding instruction and operates to command the initiation of executions performed in the G unit and the F unit, to produce corresponding signals on signal lines 123, 124 and 125. The signal on the line 123 enables the instruction to be executed by the G unit. In other words, there is produced on the signal line 123 the signal commanding reception of data from the I unit and initiation of execution of the intruction in the G unit. This signal (123) is supplied to the microprogram controller 30 which then commands the initiation of operation of the G unit through the input data selector 10. The signal on the line 124 enables the instruction to be executed by the F unit. In other words, this signal (124) commands the reception of data from the I unit and initiation of execution of intruction by the F unit. The signal on the line 125 assumes the logical level "1" when either one of the signal lines 123 and 124 is logic "1". This signal (125) is supplied to the I unit to inform that the data for executing the succeeding instruction being sent by the I unit has been received by the F unit or the G unit. When one of the declaration signals EOP, EOFB and EOFA is issued in the F unit or alternatively when the signal EOP is issued in the G unit, the signal line 122 is set to the state "1". Provided that the signal line 113 is in the state "0" and that the succeeding instruction is to be executed in the F unit, the ready signal line 118 and the F unit operation command signal line 120 assume the state "1", as a result of which an AND circuit 81 is opened to set the signal line at logic "1" level, whereupon execution of the succeeding instruction is started immediately at the next cycle.

When the signal EOFA is issued, execution of instruction in the G unit must not be initiated for the succeeding two cycles. Further, when the signal EOFB is issued, execution of the instruction to be performed by the G unit can not be initiated in the succeeding or next cycle. Such inihibition is validated through a signal line 126. The signal line 126 becomes logic 37 1" when one of latches 83 which serve for delaying the signals EOFA, EOFB and EOFA by one cycle is logic "1". The latch 83 of the state "1" indicates that the instruction being currently executed by the F unit in the cycle $FE_B$ issues the signal EOFA. When the ready signal line 118 is logic "1" with the G unit activating line 119 being "1", the signal line 126 operates to inhibit the G-unit instruction initiating command from being sent on the signal line 123. An AND circuit 82 produces logic "1" as the output only when the signal line 122 is logic "1" and the signal line is logic "0". It will be seen that the signal line 122 becomes logic "1" when the signal line 114, 115, 116 or 117 is logic "1" or when latch 85 takes the logic state "1".

The signals EOFA, EOFB and EOP are issued once in the instruction executing cycle. When no instruction whose execution is to be initiated in the succeeding cycle is designated at that time, the latch 84 holds a signal indicating that both the G unit and the F unit are in the state ready for initiating execution of an instruction in the succeeding cycle. More specifically, in case the signal line 122 is in the logic "1" state, indicating that both the G unit and the F unit are in the state for accepting an instruction, while the signal line 125 is logic "0", indicating that execution of the instruction can not be initiated in the succeeding cycle, the latch 84 is set, and the content thereof is transferred to the latch 85 under the appropriate control timing, as a result of which the signal line 122 assumes the logic "1" state in the succeeding cycle. The latch 84 is set to "1", when the I unit sends no ready signal with the signal line 118 thus being logic "0" and/or a G-unit instruction is designated as the succeeding instruction in the EOFB cycle or after two cycles from the generation of the signal EOFA. In this way, the arithmetic pipeline can be realized for the F unit while the principle of the sequential control is observed between the G unit and the F unit.

When the arithmetic result of an instruction being currently executed in the F unit is required as the input data for a succeeding instruction to be executed in the F unit although EOFA or EOFB is designated by the F unit, then the signal line 113 shown in FIG. 10 becomes logic "1". This signal is applied to the AND circuit 81 through an inverter circuit (FIG. 14). In this way, when the signal line 113 is logic "1", indicating that the succeeding instruction is to be executed in the F unit, the AND circuit 81 remains blocked, whereby the logical state of the signal line 122 is stored in the latch 84. When the instruction being currently executed in the F unit enters the cycle $FE_C$, the signal line 113 becomes logic "0", resulting in the signal line 124 being set to "1" through the AND circuit 81. In this state, it is possible to initiate execution of the succeeding instruction.

Referring again to FIG. 7, attention is paid to the register 43. This register 43 serves as a data register for transferring the content of the FPR 40 to the storage when it is to be stored as the storage operand. In this connection, it will be recalled that the store instruction is usually executed in a single cycle. During this cycle, the F unit and the G unit issue a store request to the storage unit 2 (FIG. 1) to supply data and other control information. If the write-in operation to the storage unit is performed in a period corresponding to the second cycle $FE_B$ or the third cycle $FE_C$, this process must be carefully attended to in view of the principle of the sequential control. More specifically, in case the write-in operation to the storage unit takes place in the second or third execution cycle, the store instruction for storing the content of the FPR 40 in the storage unit is handled as the instruction which can be processed by the G unit although the data is issued by the F unit. This is because the operands in the storage unit would infringe the principle of sequential control unless the store instruction is issued at a time point at which there is no interrupt condition for the preceding F-unit instruction. Under the circumstance, when the I unit decodes the instruction in concern, the G-unit activating line 119 is set to "1" in place of the F-unit activating line to issue the request for initiation of execution of the instruction. In this way, by virtue of the action of the signal line 126, initiation of execution of the instruction is indicated by the G-unit activating line 123 at a time point at which an interrupt for the preceding instruction has been detected. In this connection, the G-unit activating line 123 is so controlled by the last stage of the circuit shown in FIG. 11 that the F unit is activated in place of the G unit upon initiation of execution of the instruction. Thus, the store instruction to the FPR can be treated in the same manner as the instruction of the G unit.

As will be appreciated from the foregoing description, there has been provided according to the present invention a data processing system which includes an arithmetic unit destined to handle instructions for performing specific operations and an arithmetic unit for processing all the other instructions, wherein the arithmetic unit for executing the specific operations is so configured as to be capable of performing arithmetic operations in a pipeline fashion, whereby the processing performance or capability of the system is enhanced.

We claim:

1. An arithmetic system having pipeline arithmetic means for executing arithmetic operations in accordance with instructions provided by instruction means, comprising:
   first arithmetic means for executing simultaneously N arithmetic operations by pipelined processing for N instructions, where N is an integer equal to or larger than two; and
   first indicating means, connected to receive from said instruction means information as to the number of execution cycles required by said first arithmetic means for execution of the instruction, for indicating with a signal when each of the instructions being executed in said first arithmetic means requires N cycles before completion of the execution of the instruction;
   wherein said first arithmetic means includes means connected to said first indicating means for initiating an arithmetic operation for a new instruction in response to the indication signal of said first indicating means.

2. An arithmetic system according to claim 1, wherein said first arithmetic means includes execution delaying means for allowing an arithmetic operation which can be completed in less than N cycles to be executed in N cycles.

3. An arithmetic system according to claim 2, wherein said execution delaying means includes arithmetic circuit means and register means connected to an output of said arithmetic circuit means, whereby said arithmetic operation is executed in N cycles due to a cascade connection of said arithmetic circuit means and said register means.

4. An arithmetic system according to claim 1, wherein said first indicating means issues indication in dependence on the content of arithmetic operation designated by said instruction.

5. An arithmetic system according to claim 4, wherein said first indicating means includes circuit means for outputting a value which represents the number of cycles required for said arithmetic operation executed in response to said instruction minus N on the basis of an instruction code designated by said instruction, latch means connected to said circuit means for holding said value produced by said circuit means, means connected to said latch means for decrementing the value held by said latch means in synchronism with the execution cycle of said first arithmetic means to supply the decremented value to said latch means, and detecting means for detecting that the value held by said latch means is zero to thereby detect that N cycles remain before completion of the arithmetic operation designated by each of the instructions.

6. An arithmetic system according to claim 3, further including lap-around path means for transmitting the output of said arithmetic circuit means to the input of said first arithmetic means.

7. An arithmetic system according to claim 6, wherein said register means includes a plurality of first registers connected in cascade, wherein the output of each of said first register is supplied to the input of said first arithmetic means through said lap-around path means.

8. An arithmetic system according to claim 7, further including means for detecting that the arithmetic result of the instruction being executed by said first arithmetic means is utilized in execution of a succeeding instruction, and means for responding to the detection of said detecting means to select the output of said arithmetic circuit means or the output of said first register to be inputted to said first arithmetic means.

9. An arithmetic system according to claim 1, further including register means having a plurality of register for storing operands, said register means having an input connected to the output of said first arithmetic means and an output connected to the input of said first arithmetic means.

10. An arithmetic system according to claim 9, further including selector means, wherein the output of said register means is connected to the input of said first arithmetic means by way of said selector means;

said first arithmetic means including execution delaying means for allowing an arithmetic operation which can be completed in less than N cycle to be executed in N cycles;

said selector means having an input for receiving the output of said register means, the output of said first arithmetic means and the output of an intermediate stage of said execution delaying means, to thereby select one of said outputs to be applied to the input of said first arithmetic means.

11. An arithmetic system according to claim 10, further including detecting means for detecting that an instruction to be next executed by said first arithmetic means makes use of the arithmetic result of the instruction being executed by said first arithmetic means, wherein said selector means responds to the detection of said detecting means to select one of said outputs to be supplied to the input of said first arithmetic means.

12. An arithmetic system according to claim 11, each of the registers of said register means is assigned a respective address, and wherein said detecting means includes first hold means for holding addresses of registers of said addressable register means as operands for an instruction to be next executed; second hold means for holding addresses of registers of the addressable register means at which the arithmetic result of the instruction being executed by said first arithmetic means is to be stored; and comparison means for comparing the contents held by said first and second hold means with each other, wherein said selector means responds to the output of said comparison means to select one of said outputs to be suppied to the input of said first arithmetic means.

13. An arithmetic system according to claim 12, wherein said second hold means includes a plurality of second registers for holding addresses of the registers of said register means at which operands of a loading instruction for which cycles remains before completion of arithmetic operation are to be stored, and first comparison means for comparing the contents of said first hold means and the contents of said plurality of second registers with one another, said selector means responding to the output of said first comparison means to select correspondingly one of the outputs of different stages of said execution delaying means.

14. An arithmetic system according to claim 13, wherein said second hold means includes a third register for holding an address of the register of said register means at which the result of an arithmetic operation for the instruction for which one cycle remains before completion of the arithmetic operation is to be stored; said comparison means including a second comparator circuit for comparing the content of said first hold means with that of said third register; said selector means responding to a coincidence output of said second comparator circuit to select the output of said first arithmetic means.

15. An arithmetic system according to claim 14, further including a fourth register for storing an address of the register of said register means at which the result of an arithmetic operation for each of the instruction for which cycles remain before completion of the arithmetic operation is to be stored, a third comparator circuit for comparing the content of said first hold means with that of said fourth register, and means for inhibiting said first arithmetic means from initiating execution of an arithmetic operation for a new instruction so long as the coincidence output is produced from said third comparator circuit.

16. An arithmetic system according to claim 15, further including means for permitting said first arithmetic means to initiate an arithmetic operation for a new instruction in response to the indication of said first indicating means that N cycles remain for execution and the absence of said coincidence signal from the output of said third comparator circuit.

17. An arithmetic system according to claim 1, further including:

secohd arithmetic means for executing an arithmetic operation for one instruction at a time;

second indicating means for indicating the last cycle of the arithmetic operation for the instruction executed by said second arithmetic means;

said instruction means supplying data and control information required by said first and second arithmetic means; and enabling means for permitting one of said first and second arithmetic means to initiate an arithmetic operation for a new instruction in dependence on the indications given by said first and second indicating means;

wherein said arithmetic operation initiating means responds to said enabling means.

18. An arithmetic system according to claim 17, wherein said first arithmetic means executes floating-point instructions, while said second arithmetic means executes other instructions than the floating-point instructions.

19. An arithmetic system according to claim 17, wherein said first arithmetic means includes execution delaying means for allowing arithmetic operations which can be executed completely in less than N cycles to be executed in N cycles.

20. An arithmetic system according to claim 19, wherein said first indicating means includes means for outputting N types of instruction completion declaring signals in accordance with the number of arithmetic operation cycles required by said first arithmetic means and indicated by the instructions as said indication signals which indicate that N cycles remain before completion of the executions for the instruction; said enabling means including means for delaying initiation of arithmetic operation for said second arithmetic means in accordance with said instruction completion declaring signal corresponding to the number of the arithmetic cycles which is two or more cycles among said N types of the instruction completion declaring signals, when the succeeding instruction is to be executed by said second arithmetic means.

* * * * *